United States Patent
Chen et al.

(10) Patent No.: US 9,434,331 B2
(45) Date of Patent: Sep. 6, 2016

(54) AUTOMOTIVE ELECTRONIC SYSTEM AND POWER SUPPLY METHOD THEREOF

(71) Applicant: Realtek Semiconductor Corp., HsinChu (TW)

(72) Inventors: Chun-Yu Chen, HsinChu (TW); Tai-Yi Huang, HsinChu (TW); Ta-Chin Tseng, HsinChu (TW); Liang-Wei Huang, HsinChu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 273 days.

(21) Appl. No.: 14/162,937

(22) Filed: Jan. 24, 2014

(65) Prior Publication Data

US 2014/0288773 A1   Sep. 25, 2014

(30) Foreign Application Priority Data

Mar. 19, 2013 (TW) ............................ 102109702 A

(51) Int. Cl.
*B60R 16/03* (2006.01)
*G06F 1/32* (2006.01)

(52) U.S. Cl.
CPC ............. *B60R 16/03* (2013.01); *G06F 1/3206* (2013.01); *G06F 1/3209* (2013.01)

(58) Field of Classification Search
None
See application file for complete search history.

(56) References Cited

U.S. PATENT DOCUMENTS

| | | | | |
|---|---|---|---|---|
| 5,834,854 | A * | 11/1998 | Williams | ................ H02J 9/005 180/65.1 |
| 6,438,462 | B1 * | 8/2002 | Hanf | ..................... G06F 1/3203 340/693.4 |
| 8,823,498 | B2 * | 9/2014 | Wagner | ............. H04L 12/40032 340/12.31 |
| 2002/0140292 | A1 * | 10/2002 | Stierle | ................. F02D 41/3005 307/31 |
| 2004/0122565 | A1 * | 6/2004 | Sakurai | ................. F02D 41/062 701/1 |
| 2004/0145500 | A1 * | 7/2004 | Huebl | ............... H04L 12/40039 340/994 |
| 2005/0052081 | A1 | 3/2005 | Sayama | |
| 2007/0108840 | A1 * | 5/2007 | Amada | ................. B60R 25/246 307/9.1 |
| 2012/0105637 | A1 * | 5/2012 | Yousefi | .................. H04N 7/183 348/148 |
| 2013/0179033 | A1 * | 7/2013 | Williams | ................ B60R 16/03 701/36 |
| 2013/0307632 | A1 * | 11/2013 | Diab | ..................... H04J 3/0697 331/44 |

FOREIGN PATENT DOCUMENTS

| | | | |
|---|---|---|---|
| JP | 2006007805 | A | 1/2006 |
| JP | 2007030593 | A | 2/2007 |
| JP | 2007048890 | A | 2/2007 |
| JP | 2011020522 | A | 2/2011 |

* cited by examiner

*Primary Examiner* — Jelani Smith
*Assistant Examiner* — Donald J Wallace
(74) *Attorney, Agent, or Firm* — McClure, Qualey & Rodack, LLP

(57) ABSTRACT

An automotive electronic system and a power supply method thereof is related to the power supply method including outputting an interface signal to an automotive network, enabling a first switching regulator according to a first control signal from a control chip and/or the interface signal on the automotive network, supplying power to a network switch based on a first voltage by the first switching regulator when the first switching regulator is enabled, enabling a second switching regulator according to a second control signal from an electronic application module and/or the interface signal on the automotive network, and supplying power to the electronic application module based on the first voltage by the second switching regulator when the second switching regulator is enabled. The network switch and the electronic application module are connected to each other by the automotive network.

16 Claims, 4 Drawing Sheets

AUTOMOTIVE ELECTRONIC SYSTEM AND POWER SUPPLY METHOD THEREOF

CROSS-REFERENCES TO RELATED APPLICATIONS

This non-provisional application claims priority under 35 U.S.C. §119(a) on Patent Application No. 102109702 filed in Taiwan, R.O.C. on 2013/03/19, the entire contents of which are hereby incorporated by reference.

BACKGROUND

1. Technical Field

The present invention relates to automotive electronic systems, and particularly to an automotive electronic system and a power supply method thereof.

2. Related Art

With the rapid development of the field related to the automobile industry and the electronic industry, the automotive electronic field has become an industry attracting considerable attention. Consequently, an increasing number of functions are provided in a vehicle, so as to provide a more comfortable travel environment, better safety protection, or greater driving pleasure for a user.

However, electronic devices in the vehicle must be supplied with power by an only 12 V battery module in the vehicle during operation, and the battery module cannot be charged, especially when the vehicle is shut down. It is therefore necessary to design a power saving mechanism appropriate to an automotive environment.

SUMMARY

In an embodiment, an automotive electronic system includes a battery module, a control chip, a network switch, a first power supply circuit, an electronic application module, and a second power supply circuit.

The battery module is used for providing a first voltage. The control chip is used for outputting a first control signal. The network switch is used for outputting an interface signal.

The first power supply circuit is used for converting the first voltage into a first power supply second voltage, and outputting the first power supply second voltage to the network switch according to the first control signal and the interface signal. The second power supply circuit is used for converting the first voltage into a second power supply second voltage, and outputting the second power supply second voltage to the electronic application module according to the interface signal.

In an embodiment, a power supply method of an automotive electronic system includes: outputting a first control signal by using a control chip; enabling a first switching regulator according to the first control signal; based on a first voltage, supplying power to a network switch by using the first switching regulator; outputting an interface signal to an automotive network by using the network switch; enabling a second switching regulator according to the interface signal on the automotive network; and based on the first voltage, supplying power to an electronic application module connected to the network switch through the automotive network by using the second switching regulator.

In an embodiment, a power supply method of an automotive electronic system includes: outputting a control signal according to external information by using an electronic application module; enabling a first switching regulator according to the control signal; based on a first voltage, supplying power to the electronic application module by using the first switching regulator; outputting an interface signal to an automotive network by using the electronic application module; enabling a second switching regulator according to the interface signal on the automotive network; and based on the first voltage, supplying power to a network switch connected to the electronic application module through the automotive network by using the second switching regulator.

In an embodiment, a power supply method of an automotive electronic system includes: outputting an interface signal to an automotive network; enabling a first switching regulator according to at least one of a first control signal from a control chip and the interface signal on the automotive network; when the first switching regulator is enabled, based on a first voltage, supplying power to a network switch by using the first switching regulator; enabling a second switching regulator according to at least one of a second control signal from an electronic application module and the interface signal on the automotive network; and when the second switching regulator is enabled, based on the first voltage, supplying power to the electronic application module by using the second switching regulator. The network switch and the electronic application module are connected to each other through the automotive network.

In sum, in the case that the automotive electronic system and the power supply method thereof according to the present invention are applied, only when a user needs to use a specific function (that is, a specific electronic application module), the specific electronic application module is awoken or started; on the contrary, when the specific function is not used, the unused electronic application modules are all powered off, so as to save power.

BRIEF DESCRIPTION OF THE DRAWINGS

The present invention will become more fully understood from the detailed description given herein below for illustration only, and thus not limitative of the present invention, wherein.

DETAILED DESCRIPTION

Figure 1:
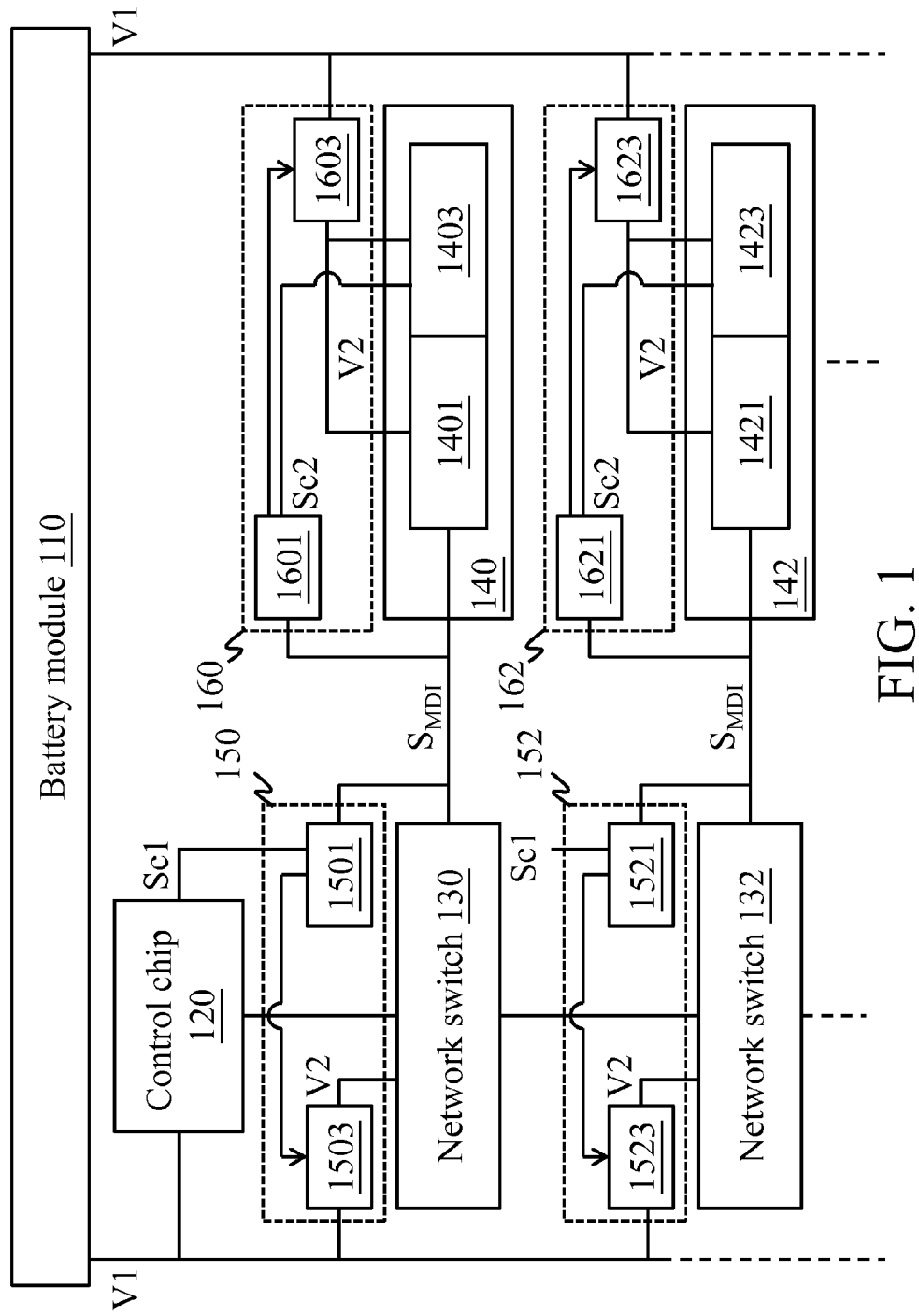
FIG. 1 is a schematic diagram of an automotive electronic system according to an embodiment of the present invention.

FIG. 1 is a schematic diagram of an automotive electronic system according to an embodiment of the present invention. Please refer to FIG. 1, in which the automotive electronic system includes a battery module 110, a control chip 120, one or more network switches 130 and 132, one or more electronic application modules 140 and 142, and a plurality of power supply circuits 150, 152, 160, and 162.

The control chip 120 and the power supply circuits 150, 152, 160, and 162 are electrically connected to the battery module 110.

The network switches 130 and 132 correspond to the electronic application modules 140 and 142 respectively, and each network switch 130/132 is electrically connected between the control chip 120 and the corresponding electronic application module 140/142. That is to say, the network switch 130 is electrically connected between the control chip 120 and the corresponding electronic application module 140, and the network switch 132 is electrically connected between the control chip 120 and the corresponding electronic application module 142.

The power supply circuits 150, 152, 160, and 162 correspond to network switches 130 and 132 and the electronic application modules 140 and 142 respectively. For clear illustration, the power supply circuits 150 and 152 corresponding to the network switches 130 and 132 are called first power supply circuits 150 and 152, and the power supply circuits 160 and 162 corresponding to the electronic application modules 140 and 142 are called second power supply circuits 160 and 162.

Each first power supply circuit 150/152 is electrically connected between the battery module 110 and the corresponding network switch 130/132. Each second power supply circuit 160/162 is electrically connected between the battery module 110 and the corresponding electronic application module 140/142.

Here, the network switches 130 and 132 and the first power supply circuits 150 and 152 belong to head end devices, and the electronic application modules 140 and 142 and the second power supply circuits 160 and 162 belong to terminal end devices. In other words, the network switch 130, the first power supply circuit 150 corresponding to the network switch 130, the electronic application module 140 corresponding to the network switch 130, and the second power supply circuit 160 corresponding to the electronic application module 140 communicate with one another through an automotive network. In the same way, the network switch 132, the first power supply circuit 152 corresponding to the network switch 132, the electronic application module 142 corresponding to the network switch 132, and the second power supply circuit 162 corresponding to the electronic application module 142 communicate with one another through the automotive network.

Here, the control chip 120 is used for outputting a first control signal Sc1. The network switch 130/132 is used for outputting an interface signal $S_{MDI}$ to the corresponding first power supply circuit 150/152, the corresponding electronic application module 140/142 and the corresponding second power supply circuit 160/162 through the automotive network. The first power supply circuit 150/152 is used for receiving a first voltage V1 provided by the battery module 110, converting the first voltage V1 into a second voltage V2, and outputting the second voltage V2 to the corresponding network switch 130/132 according to at least one of the first control signal Sc1 and the interface signal $S_{MDI}$.

The second power supply circuit 160/162 is used for receiving the first voltage V1 provided by the battery module 110, converting the first voltage V1 into a second voltage V2, and outputting the second voltage V2 to the corresponding electronic application module 140/142 according to the interface signal $S_{MDI}$. Here, the second power supply circuit 160/162 receives the interface signal $S_{MDI}$ from the corresponding network switch 130/132 through the automotive network.

In some embodiments, each electronic application module 140 (142) may include a physical layer 1401 (1421) and a functional circuit 1403 (1423). The physical layer 1401 (1421) and the functional circuit 1403 (1423) are electrically connected to the corresponding second power supply circuit 160 (162), and are supplied, by the corresponding second power supply circuit 160 (162), with circuits required for operation. Moreover, the physical layer 1401 (1421) is connected to the corresponding network switch 130 (132) and the corresponding first power supply circuit 150 (152) through the automotive network.

In some embodiments, when a vehicle is shut down, common electronic application modules 140 in the vehicle are all in a power off state. However, functions of a few electronic application modules 142, such as a keyless module or an anti-theft system, are resident. When an electronic application module 142 with a resident function is not in use, the electronic application module 142 is partially supplied with power, so as to save power. For example, when the vehicle is shut down, most of blocks of the electronic application module 142 are in a power off state, but at least a detection unit in the functional circuit 1423 is continuously supplied with power. At this time, the detection unit can detect external information.

When the detection unit in the functional circuit 1423 detects external information, the functional circuit 1423 outputs a second control signal Sc2 to the corresponding second power supply circuit 162. Here, the second power supply circuit 162 can supply power to the corresponding electronic application module 142 according to at least one of the second control signal Sc2 and the interface signal $S_{MDI}$, so as to awake the whole electronic application module 142.

Then, the physical layer 1421 outputs an interface signal $S_{MDI}$ to the corresponding first power supply circuit 152 through the automotive network, so that the first power supply circuit 152 supplies power to the corresponding network switch 132 according to the interface signal $S_{MDI}$ from the physical layer 1421, so as to awake the corresponding network switch 132.

In this way, when a user needs to use a specific function (that is, a specific electronic application module 140/142), the electronic application module 140/142 and the corresponding network switch 130/132 are awoken or started (that is, a switching regulator supplies power required for operation). On the contrary, when the specific function is not used, the unused electronic application module 140/142 and the corresponding network switch 130/132 are both powered off, so as to save power.

In some embodiments, in the electronic application module 142 with the resident function, partial blocks (for example, the detection unit in the functional circuit 1423 and the physical layer 1421), continuously supplied with power can have a sleep mechanism (for example, automatic turnoff based on timing by a timer), so as to save power.

In some embodiments, each power supply circuit may include a switching regulator and a control module. In other words, the first power supply circuit 150 includes a first control module 1501 and a first switching regulator 1503. The first power supply circuit 152 includes a first control module 1521 and a first switching regulator 1523. The second power supply circuit 160 includes a second control module 1601 and a second switching regulator 1603. The second power supply circuit 162 includes a second control module 1621 and a second switching regulator 1623.

The control modules (that is, the first control modules 1501 and 1521 and the second control modules 1601 and 1621), may be modules with uninterruptible power. In some embodiments, the first control modules 1501 and 1521 and the second control modules 1601 and 1621 may be directly electrically connected to the battery module 110 or an uninterruptible power system in the automotive electronic system. Moreover, each power supply circuit may further include an uninterruptible power system, so that the corresponding control module is kept in a continuous power supply state.

The structures and operation of the first power supply circuits 150 and 152 are roughly the same and the structures and operation of the second power supply circuits 160 and 162 are roughly the same, so the structures and operation are described in detail in the following only by taking the first power supply circuit 150 and the second power supply circuit 160 as an example.

A first input end of the first control module 1501 is connected to the control chip 120. A second input end of the first control module 1501 is connected to the corresponding network switch 130 and the corresponding electronic application module 140 through the automotive network. An output end of the first control module 1501 is connected to a control end of the first switching regulator 1503. An input end of the first switching regulator 1503 is connected to the battery module 110 and an output end of the first switching regulator 1503 is connected to the corresponding network switch 130. A connection relationship of the first power supply circuit 152 is roughly the same as that of the first power supply circuit 150, so the connection relationship is not described in detail again.

A first input end of the second control module 1601 is connected to the functional circuit 1403 of the corresponding electronic application module 140. A second input end of the second control module 1601 is connected to the corresponding network switch 130 through the automotive network. An output end of the second control module 1601 is connected to a control end of the second switching regulator 1603. An input end of the second switching regulator 1603 is connected to the battery module 110 and an output end of the second switching regulator 1603 is connected to the corresponding electronic application module 140 (for example, the physical layer 1401 and the functional circuit 1403).

Here, the first switching regulator 1503 is used as a power supply switch of the corresponding network switch 130. The second switching regulator 1603 is used as a power supply switch of the corresponding electronic application module 140. The first control module 1501 is used for controlling the first switching regulator 1503 to be on or off. The second control module 1601 is used for controlling the second switching regulator 1603 to be on or off.

In the case that the head end awakes or starts the electronic application module needing to be used, when the user needs to use the electronic application module 140, the control chip 120 outputs a first control signal Sc1 to the first control module 1501. For example, the control chip 120 pulls the first input end of the first control module 1501 to a high level (that is, a first control signal Sc1 of a high level).

The first control module 1501 enables the first switching regulator 1503 according to the first control signal Sc1. When the first switching regulator 1503 is enabled, the first switching regulator 1503 converts the first voltage V1 into the second voltage V2 and provides the second voltage V2 for the corresponding network switch 130, so as to awake/start the network switch 130.

After the network switch 130 is awoken/started, the network switch 130 sends a packet (that is, the interface signal $S_{MDI}$), to the automotive network. The corresponding second control module 1601 receives, through the automotive network, the interface signal $S_{MDI}$ sent by the network switch 130, and enables the second switching regulator 1603 according to the interface signal $S_{MDI}$. When the second switching regulator 1603 is enabled, the second switching regulator 1603 converts the first voltage V1 into the second voltage V2 and provides the second voltage V2 for the corresponding electronic application module 140, so as to awake/start the electronic application module 140.

In the case that the terminal end awakes or starts the electronic application module needing to be used, in an example, the electronic application module 142 is a keyless module. When the functional circuit 1423 of the electronic application module 142 detects a wireless signal for (that is, the foregoing external information), for example, opening an automotive door of the vehicle, the functional circuit 1423 outputs a second control signal Sc2 to the second control module 1621. For example, the functional circuit 1423 pulls the first input end of the second control module 1621 to a high level (that is, a second control signal Sc2 of a high level).

The second control module 1621 enables the second switching regulator 1623 according to the second control signal Sc2. When the second switching regulator 1623 is enabled, the second switching regulator 1623 converts the first voltage V1 into the second voltage V2 and provides the second voltage V2 for the corresponding electronic application module 142, so as to awake/start the whole electronic application module 142.

Then, the physical layer 1421 sends a packet (that is, the interface signal $S_{MDI}$), to the automotive network. The corresponding first control module 1521 receives, through the automotive network, the interface signal $S_{MDI}$ sent by the physical layer 1421, and enables the first switching regulator 1523 according to the interface signal $S_{MDI}$. When the first switching regulator 1523 is enabled, the first switching regulator 1523 converts the first voltage V1 into the second voltage V2 and provides the second voltage V2 for the corresponding network switch 132, so as to awake/start the network switch 132.

Figure 2:
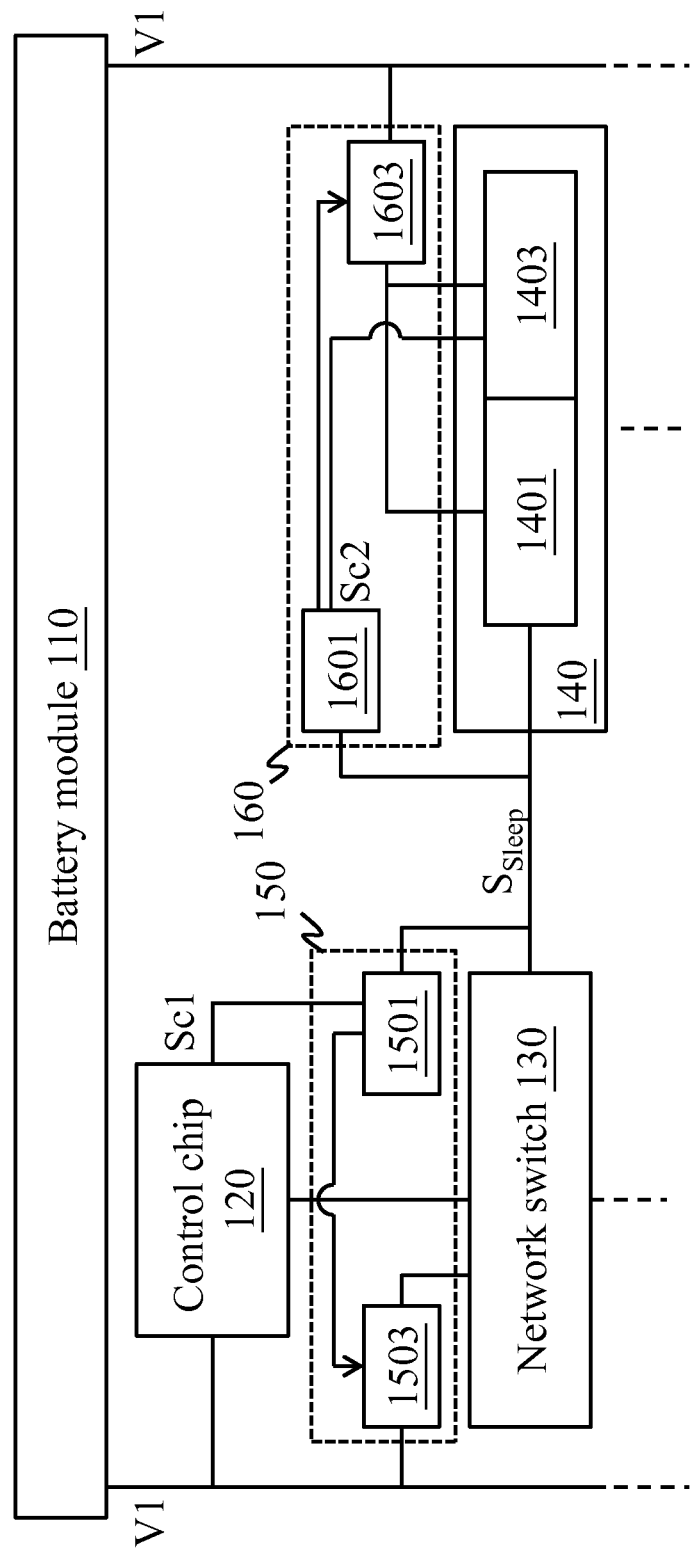
FIG. 2 is a schematic diagram of an operation of turning off a module of the automotive electronic system in FIG. 1.

In some embodiments, please refer to FIG. 2, in which when the electronic application module 140/142 is idle (completes operation or is not used), the head end can turn off the electronic application module 140/142 and the corresponding network switch 130/132. In an example, the electronic application module 140 is a rear view image module. When a central control system in the vehicle receives an instruction that the rear view image module has been used, the central control system enables the control chip 120 to send a packet with a specific pattern (called a sleep packet $S_{Sleep}$ hereinafter), and outputs the sleep packet $S_{Sleep}$ to the automotive network through the network switch 130. The physical layer 1401 of the electronic application module 140 receives the sleep packet $S_{Sleep}$ from the network switch 130 through the automotive network, and enables the functional circuit 1403 to generate a second control signal Sc2 for the second control module 1601 according to the sleep packet $S_{Sleep}$. For example, after the physical layer 1401 receives the sleep packet $S_{Sleep}$, the physical layer 1401 enables the functional circuit 1403 to pull the first input end of the second control module 1601 to a low level (that is, a second control signal Sc2 of a low level).

After the network switch 130 outputs the sleep packet $S_{Sleep}$, the network switch 130 does not send any packet to the automotive network. In other words, no signal is input at the second input end of the second control module 1601 and the second input end of the first control module 1501. In this case, the second control module 1601 disables the second switching regulator 1603 according to the second control signal Sc2. After the second switching regulator 1603 is disabled, the second switching regulator 1603 stops outputting the second voltage V2 to the electronic application module 140.

The control chip 120 generates a first control signal Sc1 for the first control module 1501, so as to turn off the first switching regulator 1503. For example, the control chip 120 pulls the first input end of the first control module 1501 to a low level (that is, a first control signal Sc1 of a low level). In this case, the first control module 1501 disables the first switching regulator 1503 according to the first control signal Sc1. After the first switching regulator 1503 is disabled, the first switching regulator 1503 stops outputting the second voltage V2 to the network switch 130. In this case, the network switch 130 and the corresponding electronic application module 140 are both turned off, and only the first control module 1501 and the second control module 1601 are still in operation.

Figure 3:
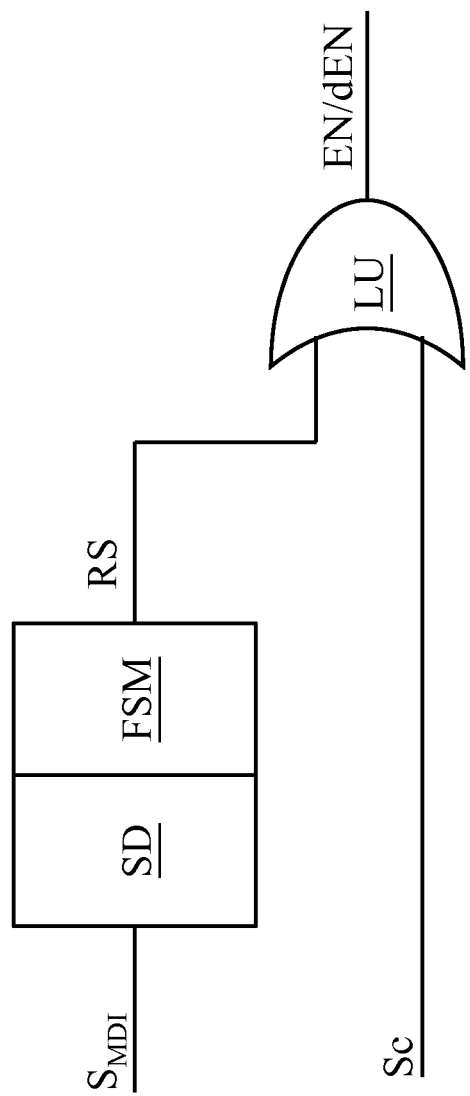
FIG. 3 is a schematic diagram of an automotive electronic system according to another embodiment of the present invention.

In some embodiments, please refer to FIG. 3, in which each control module (that is, the first control module 1501, the first control module 1521, the second control module 1601, or the second control module 1621) may include a signal detection circuit SD, a finite state machine (FSM) unit FSM, and a logic unit LU.

The signal detection circuit SD is connected to the automotive network and is electrically connected to the network switch 130 (132) and the electronic application module 140 (142) through the automotive network.

The finite state machine FSM is electrically connected to the signal detection circuit SD and a second input end of the logic unit LU.

A first input end of the logic unit LU is connected to the control chip 120 or the functional circuit 1403 (1423) of the electronic application module 140 (142), and receives a control signal Sc (that is, the first control signal Sc1 or the second control signal Sc2). An output end of the logic unit LU is connected to the corresponding switching regulator and output an enabling signal EN or disabling signal dEN to a control end of the corresponding switching regulator.

That is to say, in the first control module 1501 (1521), the first input end of the logic unit LU is connected to the control chip 120 and receives the first control signal Sc1 from the control chip 120. The output end of the logic unit LU is connected to the corresponding first switching regulator 1503 (1523) and controls the corresponding first switching regulator 1503 (1523) to be on or off according to the enabling signal EN or disabling signal dEN.

In the second control module 1601 (1621), the first input end of the logic unit LU is connected to the functional circuit 1403 (1423) of the electronic application module 140 (142) and receives the second control signal Sc2 from the functional circuit 1403 (1423). The output end of the logic unit LU is connected to the corresponding second switching regulator 1603 (1623) and controls the corresponding second switching regulator 1603 (1623) to be on or off according to the enabling signal EN or disabling signal dEN.

Here, the signal detection circuit SD can detect the interface signal $S_{MI}$ on the automotive network and output a signal detection result RS accordingly.

The finite state machine FSM can confirm that the interface signal $S_{MDI}$ detected by the signal detection circuit SD is not erroneous judgment caused by noise. In other words, the finite state machine FSM can remove a signal detection result generated by noise.

In some embodiments, the logic unit LU may be an OR gate. In this case, when the signal detection circuit SD indeed detect the interface signal $S_{MDI}$, the signal detection circuit SD may output a signal detection result RS "logic 1".

When the signal detection circuit SD indeed does not detect the interface signal $S_{MDI}$, the signal detection circuit SD outputs a signal detection result RS "logic 0".

Consequently, the logic unit LU performs a logic operation on the signal detection result RS and the control signal Sc, and outputs an enabling signal EN or disabling signal dEN to the corresponding switching regulator according to an operation result, so as to control the corresponding switching regulator to be on or off.

In some embodiments, the control chip 120 may be a head end general control chip of a vehicle. In some embodiments, the network switches 130 and 132 may be implemented by a single switch device with a plurality of channels or implemented by a plurality of spliced switch devices. In some embodiments, each electronic application module 140/142 may be, for example, a multimedia module, a rear view image module, or a keyless module. In some embodiments, the control chip 120 communicates with (is electrically connected to) the network switches 130 and 132 through an xMII communication interface such as the MII, GMII, RGMII, RMII. In some embodiments, the interface signal $S_{MDI}$ may be a medium dependent interface (MDI) signal.

In some embodiments, the automotive network may be a Controller Area Network (CAN), a Local Interconnect Network (LIN), FlexRay, IDB-1394, a Media Oriented Systems Transport (MOST) fiber network, or Ethernet.

Figure 4:
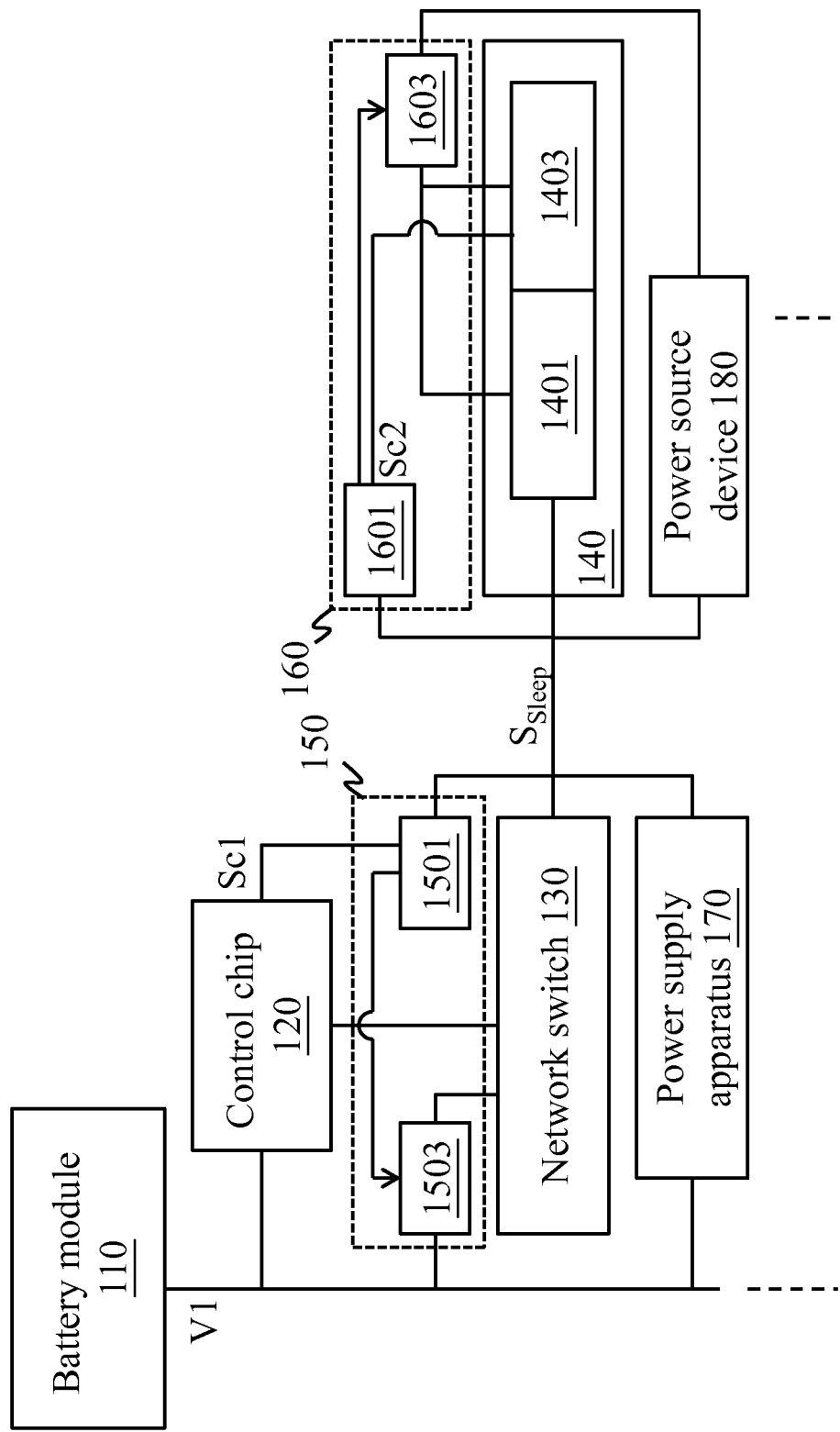
FIG. 4 is a schematic diagram of an automotive electronic system according to yet another embodiment of the present invention.

Please refer to FIG. 4, in which when the automotive network is Ethernet, the second switching regulator 1603 may be connected to the battery module 110 through a power source device 180, Ethernet, and a power supply apparatus 170. In other words, the battery module 110 inputs power (the first voltage) to Ethernet through the power supply apparatus 170, and the second switching regulator 1603 receives power on Ethernet through the power source device 180.

While the present invention has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. An automotive electronic system, comprising:
a battery module, for providing a first voltage;
a control chip, for outputting a first control signal;
a plurality of head end devices, comprising:
a network switch, for outputting an interface signal; and
a first power supply circuit, for converting the first voltage into a first power supply second voltage, and outputting the first power supply second voltage to the network switch according to the first control signal and the interface signal to awake the network switch; and
a plurality of terminal end devices, comprising:
an electronic application module, for outputting; and
a second power supply circuit, for converting the first voltage into a second power supply second voltage, and outputting the second power supply second voltage to the electronic application module according to a second control signal and the interface signal to awake the electronic application module.
2. The automotive electronic system according to claim 1, wherein the first power supply circuit comprises:

a switching regulator, for outputting the first power supply second voltage to the network switch when being enabled; and a control module, connected to the network switch through an automotive network, and used for controlling the switching regulator to be on or off according to the first control signal and the interface signal.

3. The automotive electronic system according to claim 2, wherein the control module comprises:

a signal detection circuit, connected to the network switch through the automotive network, and used for detecting the interface signal and outputting a signal detection result accordingly;

a finite state machine, for confirming detection of the signal detection circuit; and a logic unit, for enabling the switching regulator according to the first control signal and the signal detection result.

4. The automotive electronic system according to claim 2, wherein the control module is a module with uninterruptible power.

5. The automotive electronic system according to claim 1, wherein the second power supply circuit comprises:

a switching regulator, for outputting the second power supply second voltage to the electronic application module when being enabled; and a control module, connected to the network switch through an automotive network, and used for controlling the switching regulator to be on or off according to the interface signal.

6. The automotive electronic system according to claim 5, wherein the electronic application module comprises:

a physical layer, electrically connected to the control module, and connected to the first power supply circuit through the automotive network; and a functional circuit, for outputting a second control signal according to external information;

wherein the control module is further used for enabling the switching regulator according to the interface signal and the second control signal.

7. The automotive electronic system according to claim 6, wherein the control module comprises:

a signal detection circuit, connected to the network switch through the automotive network, and used for detecting the interface signal and outputting a signal detection result accordingly;

a finite state machine, for confirming detection of the signal detection circuit; and a logic unit, for enabling the switching regulator according to the second control signal and the signal detection result.

8. The automotive electronic system according to claim 5, wherein the automotive network is Ethernet and the switching regulator is electrically connected to the battery module through Ethernet.

9. The automotive electronic system according to claim 5, wherein the control module is a module with uninterruptible power.

10. A power supply method of an automotive electronic system, comprising:

outputting a first control signal by using a control chip;

enabling a first switching regulator of a plurality of head end devices according to the first control signal;

based on a first voltage, supplying power to a network switch of the plurality of head end devices by using the first switching regulator to awake the network switch;

outputting an interface signal to an automotive network by using the network switch;

enabling a second switching regulator of a plurality of terminal end devices according to the interface signal on the automotive network; and based on the first voltage, supplying power to an electronic application module of the plurality of terminal end devices, the electronic application module communicating with and connected to the network switch through the automotive network, by using the second switching regulator to awake the electronic application module.

11. The power supply method of the automotive electronic system according to claim 10, further comprising:

outputting a sleep packet by using the control chip;

sending the sleep packet to the electronic application module through the network switch and the automotive network;

generating a second control signal according to the sleep packet by using the electronic application module; and disabling the second switching regulator according to the second control signal, so that the second switching regulator stops supplying power to the electronic application module.

12. A power supply method of an automotive electronic system, comprising:

outputting a control signal according to external information by using an electronic application module of a plurality of terminal end devices;

enabling a first switching regulator of the plurality of terminal end devices according to the control signal;

based on a first voltage, supplying power to the electronic application module by using the first switching regulator to awake the electronic application module;

outputting an interface signal to an automotive network by using the electronic application module;

enabling a second switching regulator of a plurality of head end devices according to the interface signal on the automotive network; and based on the first voltage, supplying power to a network switch of the plurality of head end devices, the network switch communicating with and connected to the electronic application module through the automotive network, by using the second switching regulator to awake the network switch.

13. The power supply method of the automotive electronic system according to claim 12, wherein the control signal is generated by a functional circuit with uninterruptible power in the electronic application module.

14. A power supply method of an automotive electronic system, comprising:

outputting an interface signal to an automotive network, wherein the automotive network is connected to a network switch of a plurality of head end devices and an electronic application module of a plurality of terminal end devices, and the network switch and the electronic application module communicate with each other through the automotive network;

enabling a first switching regulator of the plurality of head end devices according to at least one of a first control signal from a control chip and the interface signal on the automotive network;

when the first switching regulator is enabled, based on a first voltage, supplying power to the network switch by using the first switching regulator to awake the network switch;

enabling a second switching regulator of the plurality of terminal end devices according to at least one of a second control signal from the electronic application module and the interface signal on the automotive network; and when the second switching regulator is enabled, based on the first voltage, supplying power to the electronic application module by using the second switching regulator to awake the electronic application module.

15. The power supply method of the automotive electronic system according to claim 14, wherein the step of enabling the first switching regulator comprises:

detecting the interface signal on the automotive network and outputting a signal detection result accordingly; and enabling the first switching regulator according to at least one of the first control signal and the signal detection result.

16. The power supply method of the automotive electronic system according to claim 14, wherein the step of enabling the second switching regulator comprises:

detecting the interface signal on the automotive network and outputting a signal detection result; and enabling the second switching regulator according to at least one of the second control signal and the signal detection result.

\* \* \* \* \*